No. 623,708. Patented Apr. 25, 1899.
P. B. ENSLEY.
LAWN RAKE.
(Application filed Aug. 22, 1898.)
(No Model.)
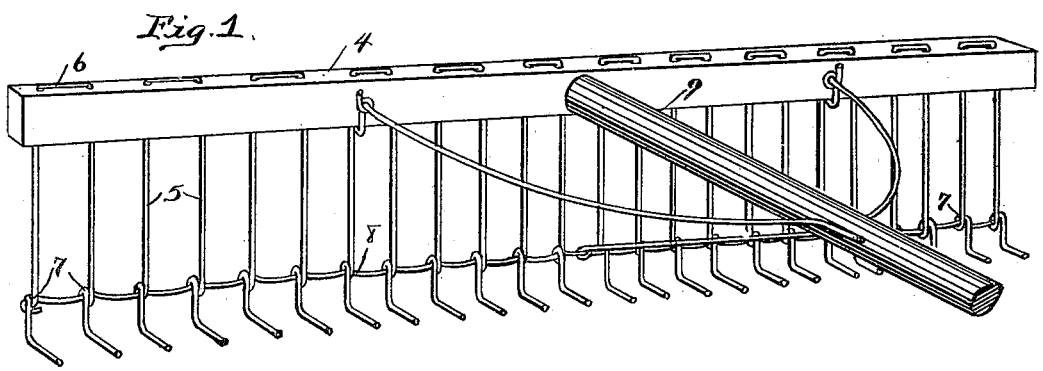
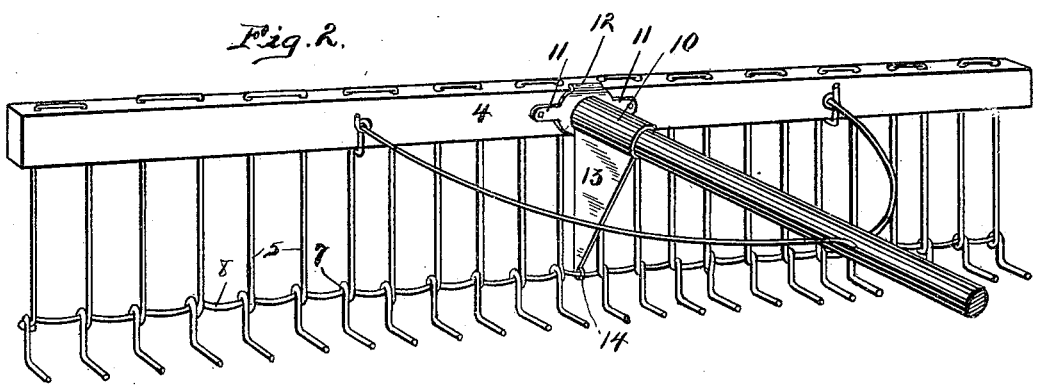
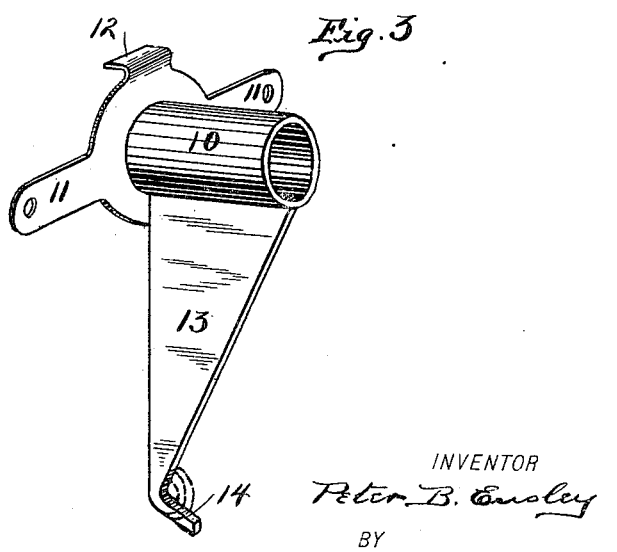
WITNESSES:
Frank A. Fable,
Jno. W. Watson
INVENTOR
Peter B. Ensley
BY
Arthur M. Hood
ATTORNEY.

United States Patent Office.

PETER B. ENSLEY, OF COLUMBUS, INDIANA, ASSIGNOR OF ONE-HALF TO MARSHAL T. REEVES, OF SAME PLACE.

LAWN-RAKE.

SPECIFICATION forming part of Letters Patent No. 623,708, dated April 25, 1899.

Application filed August 22, 1898. Serial No. 689,186. (No model.)

*To all whom it may concern:*

Be it known that I, PETER B. ENSLEY, a citizen of the United States, residing at Columbus, in the county of Bartholomew and State of Indiana, have invented a new and useful Lawn-Rake, of which the following is a specification.

My invention relates to an improvement in lawn-rakes.

The object of my invention is to produce a rake which shall be both light and strong and which may be cheaply constructed.

The accompanying drawings illustrate my invention.

Figure 1 is a perspective view of a rake embodying my invention. Fig. 2 is a similar view of a modified form thereof. Fig. 3 is a detail of the handle-socket.

In the drawings, 4 indicates a rake-head or cross-bar, through which is passed a series of rake-teeth 5. Teeth 5 are preferably formed in pairs by doubling a piece of wire and passing both ends through the head 4, thus leaving a short section 6 of the wire upon the top of the head between each pair of teeth. Each tooth 5 is provided near its lower end with an eye 7, preferably formed by bending the wire upon itself, as shown, the eyes 7 of the several teeth being in line with each other. Passed through the eyes 7 is a stiffening-rod 8, the ends of which are secured to the end teeth. In order to prevent a lateral movement of the lower ends of the teeth 5, the rod 8 is slightly kinked between the teeth, as shown. The handle 9 may be secured to the head in any desired manner; but I prefer to secure said handle by means of a socket 10, which is adapted to receive the end of the handle. The socket 10 is provided at its base with a pair of ears 11 11, by which it may be secured to the head 4, and, if desired, the lip 12 may be provided to engage the upper face of the said head. The socket 10 is also provided with a depending arm 13, preferably cast integral with the socket, and said arm is provided at its lower end with a finger 14, which may be curled around the stiffening-rod 8 near its middle, the arm 13 thus forming a brace for the lower ends of all of the teeth. By this means I am enabled to use very light wire for forming the teeth 5, the said teeth being, however, in the finished rake extremely stiff.

I claim as my invention—

1. In a lawn-rake, the combination with a suitable head and a handle secured thereto, of a series of teeth secured to said head, a stiffening-rod secured to and connecting the said teeth at a point below the head, and a brace secured at one end to the handle and at the other end to the stiffening-rod.

2. In a lawn-rake, the combination with a suitable head and a handle therefor, of a series of wire teeth secured to said head, an eye formed in each tooth by bending the wire, a stiffening-rod passed through said eyes and connecting the said teeth, and a brace secured at one end to the handle and at the other end to the stiffening-rod.

3. In a lawn-rake, the combination with a suitable head, of a series of wire teeth secured to said head, each tooth being bent so as to form an eye therein, and a stiffening-rod passed through said eyes and connecting the teeth, said rod having a kink formed therein between adjacent teeth.

4. In a lawn-rake, a handle-socket therefor consisting of a socket adapted to receive the handle, and a depending arm carried by said socket and having a finger formed upon its lower end, the said finger being adapted to be wrapped about a stiffening-rod carried by the rake-teeth, substantially as described.

5. A lawn-rake having a suitable head, a series of wire teeth secured to said head, each having an eye formed therein by bending the wire, a stiffening-rod passed through said eyes and connecting the teeth, a socket secured to the head and adapted to receive the end of a handle, and a depending arm carried by said socket and having a portion wrapped about the stiffening-rod.

PETER B. ENSLEY.

Witnesses:
ALLEN C. DENISON,
MAY A. GRAVES.